(12) United States Patent
Anand (10) Patent No.: US 9,245,261 B2
(45) Date of Patent: Jan. 26, 2016

(54) AUTOMATIC RECEIPT LOGGING AND NOTIFICATIONS FOR TRANSACTIONS

(71) Applicant: Ramalingam Krishnamurthi Anand, Los Altos Hills, CA (US)

(72) Inventor: Ramalingam Krishnamurthi Anand, Los Altos Hills, CA (US)

( * ) Notice: Subject to any disclaimer, the term of this patent is extended or adjusted under 35 U.S.C. 154(b) by 281 days.

(21) Appl. No.: 13/889,242

(22) Filed: May 7, 2013

(65) Prior Publication Data

US 2014/0337150 A1  Nov. 13, 2014

(51) Int. Cl.
*G06Q 20/00* (2012.01)
*G06Q 20/04* (2012.01)

(52) U.S. Cl.
CPC .................................. *G06Q 20/045* (2013.01)

(58) Field of Classification Search
None
See application file for complete search history.

(56) References Cited

U.S. PATENT DOCUMENTS

| 7,552,087 B2 * | 6/2009 | Schultz et al. ..... | G06Q 20/0453 705/38 |
| 2012/0290609 A1 * | 11/2012 | Britt ....................... | G06Q 30/06 707/769 |
| 2013/0268340 A1 * | 10/2013 | Colon et al. ........... | G06Q 40/08 705/14.25 |

OTHER PUBLICATIONS

"Receipt Wranglers," [online] [Retrieved on Mar. 28, 2013]; Retrieved from the Internet URL: http://online.wsj.com/article/SB10001424127887323415304578368400322638048.html; 3 pages.

* cited by examiner

*Primary Examiner* — Paul Danneman
(74) *Attorney, Agent, or Firm* — Fish & Richardson P.C.

(57) ABSTRACT

Methods, systems, and apparatus include computer programs encoded on a computer-readable storage medium, and include a method for managing and processing receipt information including identifying a user associated with a transaction; receiving a receipt for the transaction from a merchant system or a payment source used to fund the transaction; logging the receipt in a database associated with the user; providing an acknowledgement to an entity associated with the transaction and providing a notification of the transaction to a device associated with the user.

26 Claims, 3 Drawing Sheets

AUTOMATIC RECEIPT LOGGING AND NOTIFICATIONS FOR TRANSACTIONS

BACKGROUND

This specification relates to electronic transactions.

Customers can use point-of-sale (POS), online ecommerce, or other systems to initiate transactions, e.g., at brick-and-mortar locations or other locations. A transaction can occur, for example, when a user makes a purchase of goods (e.g., products) or services (e.g., rentals). Each transaction can involve multiple parties, including at least the seller and the buyer. Transactions can also include or be associated with documents such as receipts, acknowledgements, notifications, bills, reports and any other artifacts of commerce. Electronic documents can be produced automatically, such as at a first system, and provided to other systems over the Internet. Some documents can be meant for storage, e.g., to provide historical information and/or for reporting. Other documents may be viewed, stored and/or printed by the user using a mobile or non-mobile device.

SUMMARY

Systems, methods, apparatus and computer programs are provided for managing and processing receipt information. A computer-implemented method includes identifying a user associated with a transaction; receiving a receipt for the transaction from a merchant system or a payment source used to fund the transaction; logging the receipt in a database associated with the user; providing an acknowledgement to an entity associated with the transaction including providing the acknowledgement to either the merchant or an entity associated with the payment source, wherein providing the acknowledgement further comprises providing an indication of which user was associated with the logged transaction; and providing a notification of the transaction to a device associated with the user.

Aspects of the method can include one or more of the following features. Identifying the user can include receiving a user identifier from the user at a time of transaction and receiving at a time coincident with the transaction a user identifier associated with the user and known by a system that logs the receipt. The method can include enabling an account associated with the user including creating a user identifier to be associated with the account and wherein identifying the user further includes receiving the user identifier from the user and coincident with the transaction. Receiving the user identifier coincident with the transaction can further include receiving the user identifier from a point of sale system that is used to support the transaction. Receiving the user identifier coincident with the transaction can further include receiving the user identifier from an on-line entity associated with the transaction.

Enabling an account can further include creating an account, a database and rules for managing receipts that are received and providing an interface for enabling a user to search for receipts. Providing an interface can further include providing an interface to surface spend pattern reports to account holders. Receiving a receipt can include receiving a receipt for a transaction that is pending for a user at a merchant and wherein the receipt includes information for the transaction including one or more of a transaction date, a transaction amount, transaction details related to items associated with the transaction, a payment method, an identifier for goods or service provided, stock-keeping unit (SKU) numbers, approval codes or a geographical location of the transaction.

Logging the receipt can further include storing the transaction in a searchable database. Logging the receipt can further include analyzing spend patterns of the user and producing reports related to spend patterns. Analyzing spend patterns occurs automatically or can be triggered by a user requesting spend data for certain types of activities, certain dates, certain time periods, or certain locations. Analyzing spending patterns can further include providing a view of a spending pattern wherein the view is selected from the group comprising a time-based view, a geographic view, a business activity view, a market segment view, a spend category view, an itemized view, a currency view, product service/repair view or a health care account view. Logging the receipt can further include storing information for a receipt in a database that is indexed by one or more of geographical location, date of transaction, type of good or service, payment mechanism, vendor or other categorization based on information included in received receipts.

Providing an acknowledgment can include providing a user identifier associated with the user associated with the transaction so that the entity associated with the transaction can verify that the receipt was attributed to a correct user. Providing the notification can include providing transaction details, receiving an indication of an acceptance or repudiation of the transaction from a user, and providing notification to the entity associated with the transaction of an indication of an acceptance or repudiation of the transaction in real time.

The method can include mining data in the database associated with logged receipts and providing targeted content delivery to the user based on the mined data. Providing the acknowledgment can include providing an offer to the user based at least in part on details of the transaction. The method can include providing an interface to enable a user to search for a receipt for a particular transaction and presenting a located receipt so as to facilitate a return of merchandise associated with the transaction. The method can include receiving notice of a recall for a product, locating a receipt in the database that indicates purchase of the product, and providing a notice to a user associated with the purchase of the recall. The method can include identifying a product that is part of a transaction, determining whether a product registration is required for the product, and registering the product for a user including providing details related to a receipt that has been received for a given transaction.

The method can include seeking approval to register the product from a user and, upon receipt of approval, registering the product. Providing a notification can further include identifying one or more restrictions on a user account, evaluating a current receipt to determine if one or more of the restrictions has been violated and notifying the user when the restriction has been violated. The restrictions can relate to set thresholds for one or more of a purchase amount, a purchase location, a purchase aggregate amount in a time period, purchase aggregate by category of purchase (e.g., gasoline or fuel), a number of purchases in a time period, a geographically constrained purchase, or a currency restricted purchase. The method can include presenting spend data for a series of transactions for a user including rendering one or more graphics that present the spend data. The method can include evaluating spend data associated with logged receipts and presenting a spend-by-location view of the transactions where the spend-by-location view presents spend information on a map effectively linking spend information with specific locations shown on the map.

Particular implementations may realize none, one or more of the following advantages. Receipts associated with a transaction can be managed for a user in association with a remote service. The remote service can provide summaries and reports related to aggregated transactions of the user including ones where payment was provided with different payment systems. The user can be included in an instantaneous fraud detection system that provides notification to the user in near real time with a transaction. A full loop can be provided to alert a merchant in real time in the event the owner associated with a payment mechanism repudiates a charge based on the real time notification. Trends and spend pattern information can be generated for custom or semi-custom reporting to individual users. These and other advantages are possible.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems, mechanisms and methods for handling and managing information related to transactions. For example, a transaction can occur between a user and a point-of-sale (POS) system at a brick-and-mortar location such as a store or restaurant. In another example, the transaction can occur online, such as part of an ecommerce transaction using a vendor specific or universal payment system, e.g., on the Internet. A receipt and/or other transaction data can be generated that is automatically provided to a central service (e.g., a cloud based service) for processing and storage. The central service can send an acknowledgement to the POS system that confirms delivery of the receipt. A notification associated with the transaction and/or receipt can be sent by the central service to a device (e.g., a mobile device) associated with the user who was part of the transaction. For example, the user can view the receipt on a mobile device just moments after the transaction has occurred—allowing the user to immediately validate the purchases and match it with any store display of the transaction list. The central service can also facilitate other types of operations, such as to generate reports requested by the user.

Figure 1:
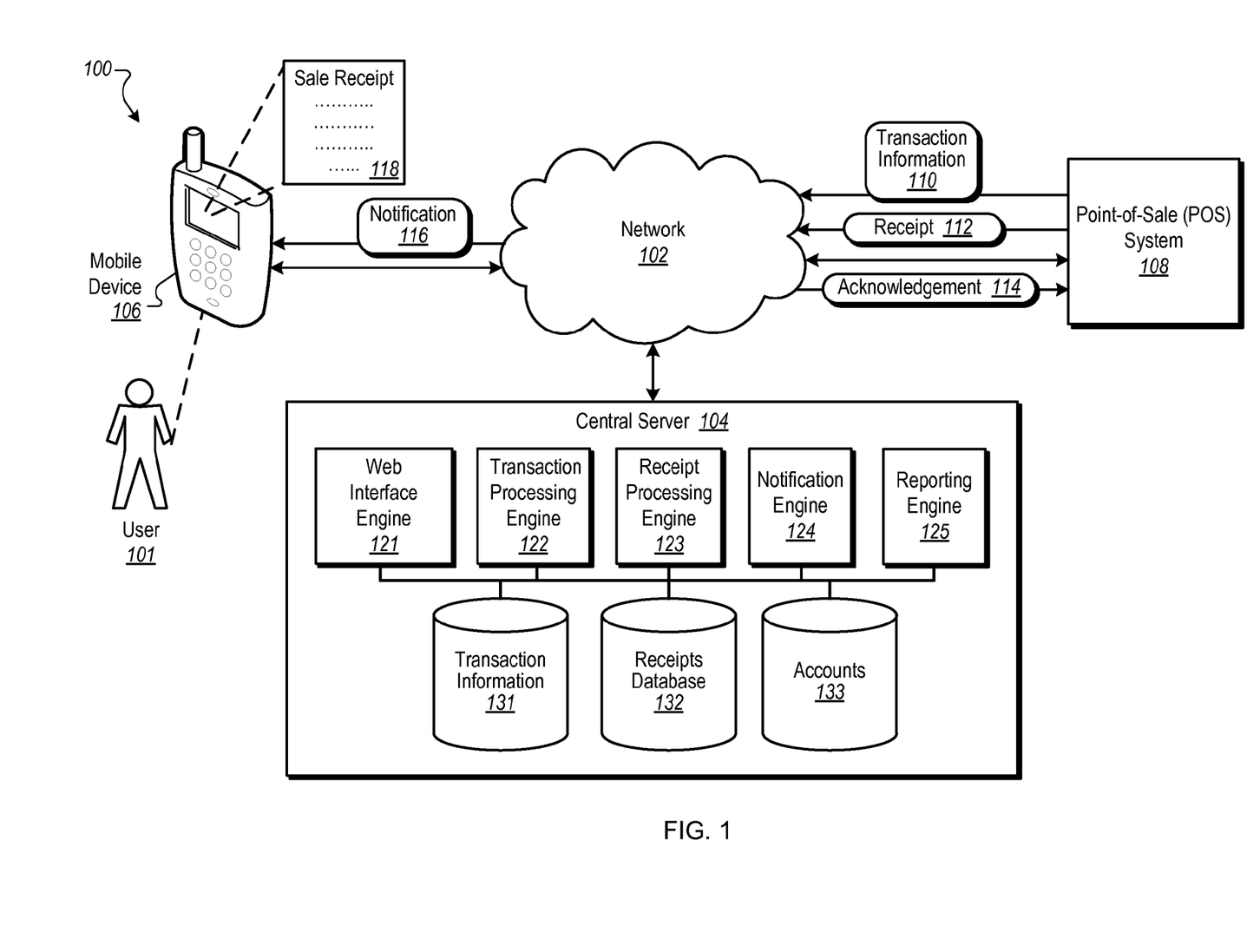
FIG. 1 is a block diagram of an example environment for logging receipts and providing acknowledgements and notifications for transactions.

FIG. 1 is a block diagram of an example environment 100 for logging receipts and providing acknowledgements and notifications for transactions. The example environment 100 includes at least one point-of-sale (POS) system 108 and at least one mobile device 106. While the example environment includes just a single POS system, the principles disclosed herein are applicable to transactions that are conducted with any of a number of different POS systems or with other payment systems, such as those associated with on-line transactions including an online ecommerce payment portal or gateway. Similarly, while reference is made to one mobile device 106, the user may be associated with one or more devices, some of which may not be mobile. The example environment 100 further includes a central server 104 for handing receipts, notifications, acknowledgements and reporting associated with transactions among POS systems 108 and users having mobile devices 106. The example environment 100 includes a network 102, such as a local area network (LAN), a wide area network (WAN), the Internet, or a combination thereof. The network 102 connects (e.g., securely) the POS systems 108, mobile devices 106, the central server 104 and other systems that may interact with the POS systems 108, the mobile devices 106, and the central server 104. The example environment 100 may include many thousands of POS systems 108 and mobile devices 106. While the examples in this disclosure generally discuss mobile devices, the systems, mechanisms and methods described herein can also use, or apply to, non-mobile devices.

The central server 104 can include plural engines. A web interface engine 121 can provide an interface between the central server 104 and external systems, including mobile devices 106, POS systems 108 and web-based ecommerce systems (so as to allow for viewing web reports/summaries). The web interface engine 121 can also provide a communication channel for other engines in the central server 104. The web interface engine 121 can be used to create an account on the central server, e.g., for a user. The web interface engine 121 can also be used to manage multiple accounts for a user or a single view for a family or even an aggregated view for expense management for a company of employees.

A transaction processing engine 122 can process transaction information 110 received from systems that are external from the central server 104, including POS systems 108 and other business and ecommerce systems. The transaction processing engine 122 can store information about transaction in a data store of transaction information 131. The transaction processing engine 122 can store account information associated with a user and/or the transaction in a database of accounts 133.

A receipt processing engine 123 can process receipts 112 received from POS systems 108 as well as other sources. Information about the receipts can be stored in a receipts database 132. For example, the information in the receipts database 132 can be used to support providing receipt notifications and other notifications 116 to mobile devices 106. Information in the receipts database 132 can also be used in generating reports.

A notification engine 124, for example, can provide notifications 116, e.g., to mobile devices 106 associated with users who have completed a transaction. In some implementations, the notification engine 124 can create acknowledgements 114 that can be sent to an entity associated with a transaction and/or to POS systems 108. In some implementations, information from a notification 116 can be used on the mobile device 106 to display a receipt 118. The notification engine 124 can be configured by the user based on their preferences.

A reporting engine 125, for example, can generate reports and handle queries and/or other requests received from the mobile device 106. For example, the reporting engine 125 can generate reports using at least one of transaction information 131, receipts stored in the receipts database 132, and accounts 133. Other sources for information for reports can be used. The reporting engine 125 can be configured to generate specific report types for the user.

Figure 2:
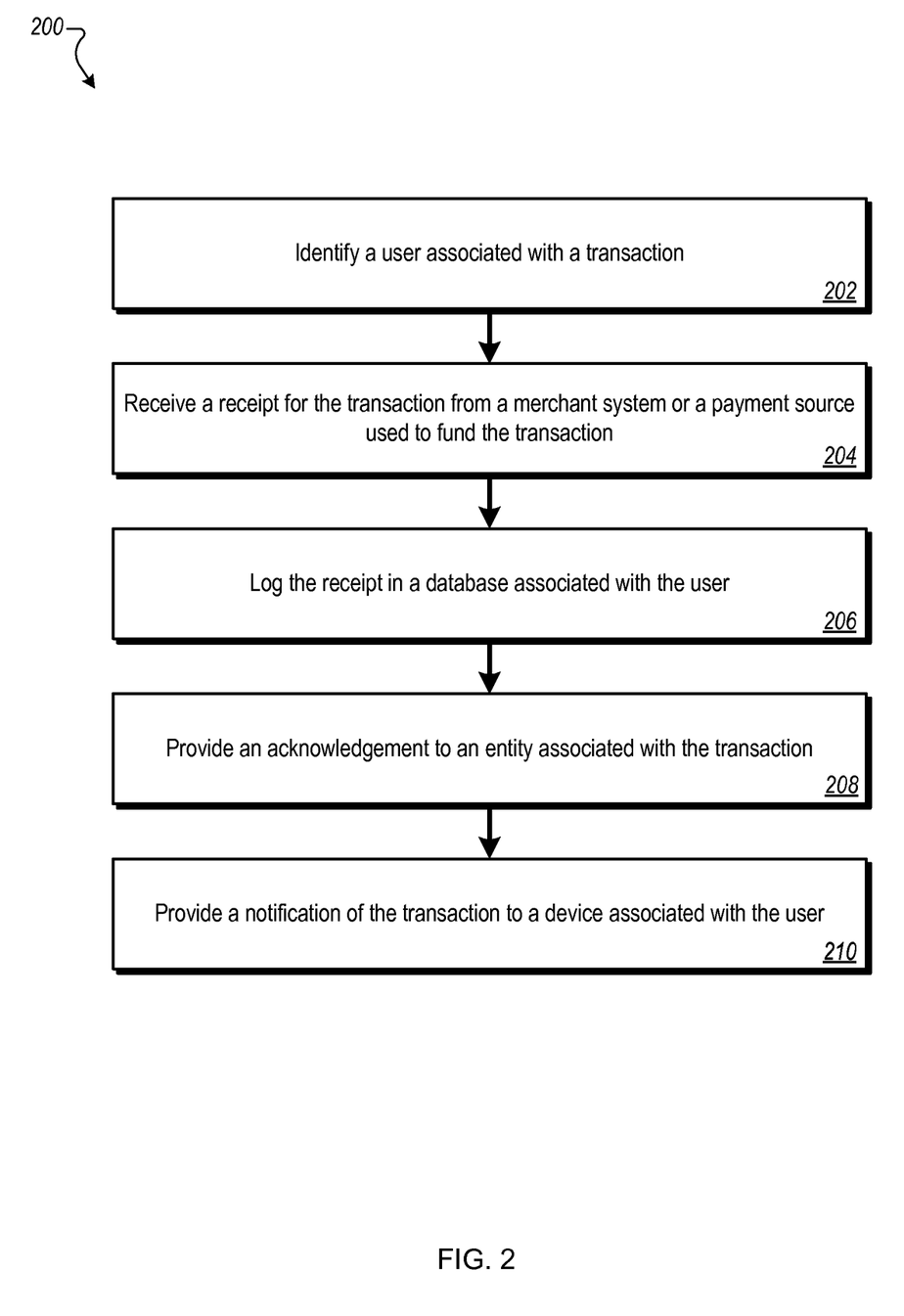
FIG. 2 is a flowchart of an example process for logging a receipt and providing an acknowledgement and a notification for a transaction.

FIG. 2 is a flowchart of an example process 200 for logging a receipt and providing an acknowledgement and a notification for a transaction. In some implementations, the central server 104 and/or its components can perform stages of the process 200 using instructions that are executed by one or more processors. FIG. 1 is used to provide example structures for performing the stages of the process 200.

A user account is created (202). As described above, the transaction processing engine and the web interface engine can be used to create and maintain an account of a user associated with the service. The account can include one or more secure and unique identifiers for the user. The user can be identified by providing the identifier as part of the transaction. In some implementations, the user provides a loyalty or other membership identifier as part of the transaction which can be linked to the user's identity in the service. For example, a user purchasing an item at a brick and mortar location can swipe a loyalty card and provide an indication to the POS system of a desire/intent to have the receipt information provided to the service. The intent can be manifested as part of a current indication, a default or a prior preference. The transaction, for example, can be a sale between the POS system 108 and the user 101 who owns the mobile device 106. As will be discussed below, the POS system 108 can provide transaction information 110 to the central server 104 based for example on this intent.

In some implementations, creating the user account can include receiving a plurality of user identifiers from the user, each being associated with different vendors/POS systems. For example, the user 101 can provide user information such as one or more of a user name, account number, password, email or phone number when using a given POS system 108, ecommerce system or other system for completing transactions. Industry standard and tested authentication mechanisms can be used to manage identity and authorization for users.

As will be discussed in greater detail below, the different identifiers associated with the user can be maintained by the system and used to determine which account is associated with a given received transaction record. In some implementations, the user is provided with an identifier that is then provided to the transaction system at the time of transaction. This identifier can be unique for the user in the service.

For example, when using the POS system 108, the user may specify or be associated with an account number or other user identifier for use in linking the user to an associated account. The account, for example, can exist in the central server 104 (e.g., within the accounts 133) and/or somewhere else in the cloud. In some implementations, multiple accounts can be associated with the same transaction.

In some implementations, the process 200 can further include enabling an account associated with the user, including creating a universal user identifier to be associated with the account, and which can be received coincident with a given transaction. For example, if an account for the user 101 does not already exist (e.g., in the accounts 133), then the transaction processing engine 122 can create a new account for the user 101 using information that the user 101 provides to the POS system 108 during the transaction.

In some implementations, receiving the user identifier coincident with the transaction can further include receiving the user identifier from a POS system or ecommerce transaction system that is used to support the transaction. For example, the POS system 108 (or another system in which the transaction occurs) can provide the user identifier (e.g., an account number for user 101) to the central server 104, e.g., as part of the transaction information 110.

In some implementations, receiving the user identifier coincident with the transaction can further include receiving the user identifier from an on-line entity associated with the transaction. For example, at the time of the transaction, some other system (not shown in FIG. 1) that is associated with the POS system 108 can provide the user identifier. In this way, while the transaction occurs in a POS system 108, e.g., in one city, the account number can be provided to the central server 104 by a system in a different city, state or country.

In some implementations, enabling an account can further include creating an account (e.g., a secure account) and rules for managing receipts that are received, and an interface can be provided for enabling a user to search for one or more specific receipts. For example, the receipts database 132 can be a secure database and/or have secure access so that the user 101 can be provided with an interface for viewing and managing receipts. Using the interface, for example, the user 101 can perform several different receipt-related actions, such as viewing, sorting, printing, managing, storing, archiving, searching and/or other actions.

In some implementations, providing the interface can further include providing an interface to surface spend pattern reports to account holders. For example, using an interface accessible to the mobile device 106, the user can request and receive reports that include information from transactions and show the user's spend patterns.

In the real time portion of the method, a receipt for the transaction is received from a merchant system or a payment source used to fund the transaction (204). For example, the receipt 112 can be provided by the POS system 108, an online ecommerce system, an offline system at a brick-and-mortar location, or some other system. In some implementations, the transaction information 110 and the receipt 112 can be provided to the service. The receipt can include conventional information that might be found on a receipt, while additional information can be included in the transaction information. Types of transaction information are described below. In some implementations, the receipt and transaction information can be combined into a single message that can be sent, for example, from the POS system 108 to the central server 104.

In some implementations, receiving the receipt and transaction information can include receiving a receipt for a transaction that is pending for a user at a merchant, and information for the transaction including one or more of a transaction date, a transaction time (e.g., including time zone information), a transaction identifier, a transaction amount, transaction details related to items associated with the transaction, a payment method, an identifier for goods or service provided, merchant-specific stock-keeping unit (SKU) numbers, approval codes, a geographical location of the transaction, sales and other tax details, discounts or rebate data. In some implementations, some portions of the receipt data may be incomplete, such as to be provided later by the user 101 and/or by other sources.

The receipt is logged in a database associated with user (206). As an example, the receipt processing engine 123 can pre-process, format and log the receipt 112 associated with the sale transaction in a rich, multi-field secure database, such as the receipts database 132. Receipt information that is logged can identify the user 101 as the user associated with the receipt (and the transaction).

In some implementations, logging the receipt can further include storing the transaction in a searchable database. For example, when the transaction processing engine 122 logs the receipt 112, e.g., in the receipts database 132 or in other database, the storage can include making the information searchable, such as by the user 101 or other individuals and/or systems.

In some implementations, logging the receipt can further include analyzing spend patterns of the user and producing reports related to spend patterns. For example, as each receipt 112 is handled and processed by the transaction processing engine 122, spend information can be obtained from the receipt 112 that can be used immediately to update spend pattern statistics (e.g., available to the user 101 in real time), or the information can be stored for later use in generating spend pattern reports.

In some implementations, logging the receipt can further include storing information for a receipt in a database that is indexed by one or more of geographic location, date of transaction, type of good or service, payment mechanism, vendor or other categorization based on information included in received receipts. For example, for each receipt 112 handled and processed by the transaction processing engine 122, index information can be stored in the receipts database 132. The index information can facilitate indexed retrieval of receipt information using indexes for geographic location, date and time of transaction, type of good or service, payment mechanism, vendor or other categorization based on information included in received receipts. Indexing can also support searching for receipts based on various criteria.

In some implementations, analyzing spend patterns can occur automatically or can be triggered by a user requesting spend data for certain types of activities, classes of transactions, by merchant, by classes of merchants, by certain dates, by certain time periods, by certain events or by certain locations. For example, as transactions information 110 and receipts are received, the transaction processing engine 122 and the receipt processing engine 123 can automatically update statistics in order to categorize spend pattern information. In some implementations, different ways of categorizing and presenting the spend pattern information can be requested by the user on an as needed basis.

In some implementations, analyzing spending patterns can further include providing a view of a spending pattern, and the view can be selected from the group comprising a time-based view, a geographic view, a business activity view, a market segment view, a spend category view, an itemized view, a currency view, a maintenance schedule view, a service schedule view, a taxation view or a health care account view. For example, the transaction processing engine 122 can store information in the receipts database 132 so as to support the generation of reports having different views. In another example, the reporting engine 125 can generate one or more reports associated with one or more different views that are specified by the user at report generation time.

An acknowledgement is provided to an entity associated with the transaction (208). The acknowledgement is provided to either the merchant or an entity associated with the payment source. The acknowledgement includes an indication of which user was associated with the logged transaction. For example, the notification engine 124 can provide a close-to-instantaneous acknowledgement 114 to the POS system 108, e.g., almost immediately after receiving the transaction information and receipt. In the current example, the acknowledgement 114 can identify the user 101 as the user associated with the transaction.

In some implementations, providing the acknowledgment can include providing a user identifier associated with the user and associated with the transaction so that the entity or merchant associated with the transaction can verify that the receipt was attributed to a correct user or for other purposes. For example, the acknowledgement 114 that the notification engine 124 generates for the POS system 108 can include the user name, account number and/or other forms of user identification.

In some implementations, providing the acknowledgment can include providing an offer to the user based at least in part on details of the transaction. As an example, the acknowledgement 114 can include an offer to the user 101 from an entity associated with the POS system 108, e.g., the offer being to buy a product at a certain price. In some implementations, information associated with the offer can be displayed at the POS (on a display associated with the POS system) or on a device associated with the user.

In addition to an acknowledgment back to the payment system, a notification of the transaction is provided to a device associated with the user (210). For example, the notification engine 124 can provide a close-to-instantaneous notification 116 to the mobile device 106, e.g., to comply with existing commerce regulations for providing receipts to customers upon completion of purchases/payments and also to provide an easy mechanism for a user to detect fraudulent use of an account.

In some implementations, providing the notification can include providing transaction details including location and time of transaction. In some implementations, after receipt of the notification, a user may be given the opportunity of providing an indication of an acceptance or repudiation of a transaction. For example, a notification may be included to the user that includes a control which the user can invoke to accept or repudiate the transaction (such as when the user believes that no transaction has occurred and is able to instantaneously repudiate the transaction). The service can receive an indication of an acceptance or repudiation of the transaction from a user, and provide notification to the entity associated with the transaction of an indication of an acceptance or repudiation of the transaction in real time. For example, the notification 116 can include the date and time of the transaction involving the user 101 and the POS system 108. The notification 116 can also include, for example, a control for enabling the user to accept or repudiate the transaction. Acceptance or repudiation can occur, for example, when the user views the notification 116 on the mobile device 106 and provides input specifying acceptance or repudiation, which can be provided to the central server 104 (e.g., for subsequent notification).

In some implementations, providing the notification can further include identifying one or more restrictions on a user account, evaluating a current receipt to determine if one or more of the restrictions has been violated, and notifying the user when the restriction has been violated. For example, the accounts 133 can contain information for the user 101 associated with the types of transaction for which the user 101 has specified a restriction and/or notification preferences. If the transaction processing engine 122 detects that a user-specified restriction has been violated, then the notification engine 124 can generate a notification that can be provided to the mobile device 106 for presentation to the user 101. Example restrictions can include set thresholds for one or more of a purchase amount, a purchase location, a purchase aggregate amount in a time period, a number of purchases in a time period or window, a geographically constrained purchase constraint, or a currency restricted purchase constraint.

In some implementations, the process 200 can also include mining data in the database associated with logged receipts and providing targeted content delivery to the user based on the mined data. For example, a user using the mobile device 106 or some other front-end device and user interface can mine specific data from data stored by the central server 104. Further, a content management and presentation system can use information in the receipts database 132 to identify and/or select content to deliver to a user.

In some implementations, the process 200 can further include providing an interface to enable a user to search for a receipt for a particular transaction and presenting a located receipt so as to facilitate a return of merchandise associated with the transaction. For example, information from the central server 104 can be provided to the mobile device 106 for use in a user interface for user actions associated with receipts (e.g., searching, displaying, printing and other actions). The reporting engine 125, for example, can look up a receipt identified by the user 101, and provide information for the receipt from the receipts database 132 to the mobile device 106 for display to the user 101.

In some implementations, the process 200 can further include receiving notice of a recall for a product by linking to merchants or manufacturers of product, locating a receipt in the database that indicates purchase of the product, and providing a notice to a user associated with the purchase of the recall and specific actions to perform based on the recall. For example, a third-party system (e.g., a toaster manufacturer) may provide a recall notice to the central server 104, or the central server 104 may obtain the information online or through other sources. Using product information associated with the recall notice, the reporting engine 135, for example, can look up receipts in the receipts database 132 that are associated with the recalled product. The notification engine 124 can send a notification to the mobile device/s 106 or some other computer device associated with the user/s 101 with which the receipt/s is/are associated. This is especially important for health or safety related recalls—for example, purchasers of certain batches of spinach can be notified when they are at risk for *Salmonella*. Warranty expiration notification or renewal notification is another example of a notification that can be provided to a user based on mining the receipts database.

In some implementations, the process 200 can further include identifying a product that is part of a transaction, determining whether a product registration is required for the product, and registering the product with either the manufacturers or the merchants for a user, including providing details related to a receipt that has been received for a given transaction. For example, the transaction processing engine 122 can obtain product information from the transaction information 110 and/or receipt 112—including product serial number, product manufacturing date, or lot number. Using that information, the transaction processing engine 122 can identify, either locally or through a third-party website, whether the product requires registration. If registration is required, for example, then the transaction processing engine 122 can provide registration information to necessary parties, including the product manufacturer, the merchant and/or other parties with or without (e.g., automatically) direct interaction of the user. The information provided, for example, can include information from the transaction information 110 and/or receipt 112.

In some implementations, e.g., before registration occurs, the central server 104 can seek approval from the user 101 for registering the product. In some implementations, an approval process can include a notification (e.g., generated by the notification engine 124 and sent to the mobile device 106) and receipt of a confirmation (or denial) from the mobile device 106. For example, the confirmation or denial can be based on user review of the notification on the mobile device 106 and selection of a corresponding control to either confirm or deny the registration process.

In some implementations, the process 200 can further include presenting spend data for a series of transactions for a user, including rendering one or more graphics that present the spend data. For example, the reporting engine 125 can generate spend data information that can be provided to the mobile device 106.

In some implementations, the process 200 can further include evaluating spend data associated with logged receipts and presenting a spend-by-location view of the transactions where the spend-by-location view presents spend information on a map effectively linking spend information with specific locations shown on the map. For example, some of the report information provided by the reporting engine 135 can be used to generate geographic location-based spend information, such as on a map that identifies the locations of entities associated with transactions and receipts for the user 101. Locations, e.g., a specific restaurant, can be represented individually with push pins or other markers, or locations can be generalized (e.g., grouped by city or other region).

In some implementations, the process 200 can further include providing notifications and scheduling updates for servicing products. For example, the notification engine 124 can create notifications related to automobile service, including details of scheduled, pending and completed services. In some implementations, the notifications can provide information that facilitates user flexibility in selecting from a variety of servicing vendors, e.g., without a loss of information or continuity on prior records and automobile services received.

In some implementations, the process 200 can further include providing expense reports, including for expense report filing. For example, the reporting engine 125 can generate expense reports and business reports that the user 101 can view on the mobile device 106 and/or reports that can be provided to, or filed with, enterprise business systems or other recipients.

In some implementations, the process 200 can further include providing health care expense reports, including flexible spending account (FSA) reports. For example, using information about stored receipts (e.g., categorized by health care-related expenses), the reporting engine can generate FSA or other reports that cover expenses for selected periods, including year-to-date, expenses since the previous report, expenses by category (e.g., medical versus dental), or expenses for a policy year. The reports can be generated to include aggregated expenses from multiple vendors and institutions, and can be used by the user 101 to count and validate against FSA limits.

In some implementations, the process 200 can further include providing annual business and other taxation reports. For example, the reporting engine 125 can generate quarterly, bi-annual and/or annual reports for a calendar year or tax year that the user 101 can use for filing and/or reporting federal, state, local, use-tax and other taxes.

In some implementations, the process 200 can further include providing expense comparison review reports for different time periods. For example, the reporting engine 125 can generate expense reports that allow users to compare spending or other details across multiple time periods, e.g., comparing quarter A versus quarter B, year X versus other years, and other time-based comparisons.

Figure 3:
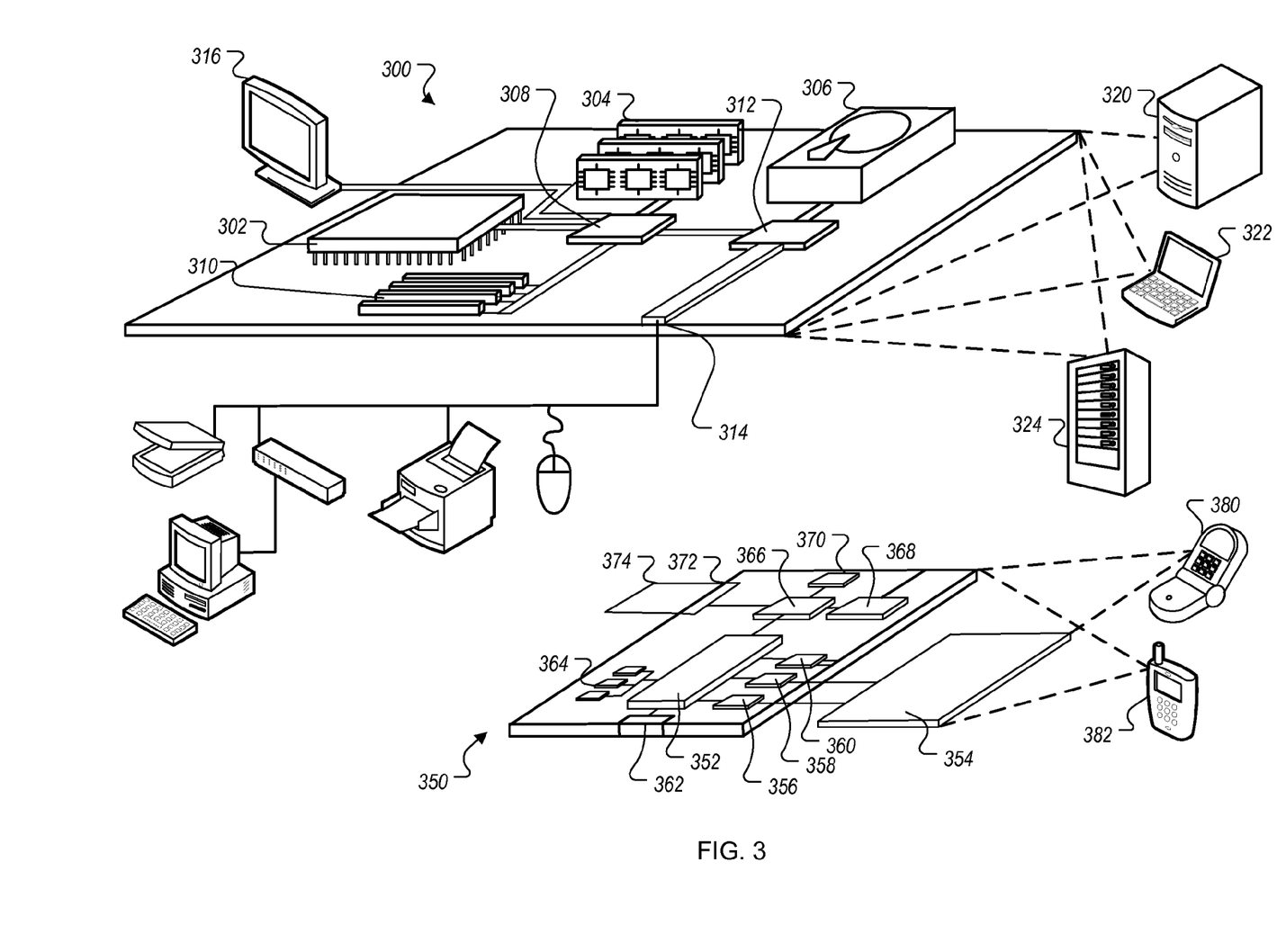
FIG. 3 is a block diagram of an example computer system that can be used to implement the methods, systems and processes described in this disclosure.

FIG. 3 is a block diagram of example computing devices 300, 350 that may be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processors embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure or wired Ethernet) or for wireless communication (e.g., via Wi-Fi, Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a subscriber identification module (SIM) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, Wi-Fi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network) either secure or unsecured. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
automatically receiving, by a server, a receipt for the transaction directly from a merchant point of sale system or an online payment system used to fund the transaction;
identifying, by the server, a user associated with a transaction based on information included in the receipt;
logging, by the server, the receipt in a database associated with the user including storing the receipt in an association with an account of the user;
providing by the server an acknowledgement to an entity associated with the transaction, wherein the entity is not the user, including providing the acknowledgement to either the merchant or an entity associated with the online payment system, wherein providing the acknowledgement further comprises providing an indication of which user was associated with the logged transaction;
after receiving the receipt, evaluating, by the server, the account associated with the user and identifying a device associated with the user;
processing, by the server, the receipt including determining a product purchased as part of the transaction and identifying one or more additional content items that are relevant to the purchased product; and
automatically providing, at a time contemporaneous with the transaction and by the server, a notification of the transaction directly to the device associated with the user without using the merchant point of sale system or online payment system, wherein the notification includes details of the transaction and one or more of the one or more additional content items, wherein the one or more additional content items not being included in the received receipt.

2. The method of claim 1 wherein identifying the user includes receiving a user identifier for the user at a time of transaction.

3. The method of claim 1 wherein identifying the user includes receiving at a time coincident with the transaction a user identifier associated with the user and known by a system that logs the receipt.

4. The method of claim 3 wherein receiving the user identifier coincident with the transaction further includes receiving the user identifier from a point of sale system that is used to support the transaction.

5. The method of claim 3 wherein receiving the user identifier coincident with the transaction further includes receiving the user identifier from an on-line entity associated with the transaction.

6. The method of claim 3 wherein enabling an account further includes creating an account and rules for managing receipts that are received and providing an interface for enabling a user to search for receipts.

7. The method of claim 6 wherein providing an interface further includes providing an interface to view and send spending pattern reports to account holders.

8. The method of claim 1 further comprising enabling an account associated with the user including creating a user identifier to be associated with the account and wherein identifying the user further includes receiving the user identifier from the user and coincident with the transaction.

9. The method of claim 1 wherein receiving a receipt includes receiving a receipt for a transaction that is pending for a user at a merchant and wherein the receipt includes information for the transaction including one or more of a transaction date, a transaction amount, transaction details related to items associated with the transaction, a payment method, an identifier for goods or service provided, stock-keeping unit (SKU) numbers, approval codes or a location of the transaction.

10. The method of claim 1 wherein logging the receipt further includes storing the transaction in a searchable database.

11. The method of claim 10 wherein logging the receipt further includes analyzing spend patterns of the user and producing reports related to spend patterns.

12. The method of claim 11 wherein analyzing spend patterns occurs automatically or can be triggered by a user requesting spend data for certain types of activities, certain dates, certain time periods, or certain locations.

13. The method of claim 11 wherein analyzing spending patterns further includes providing a view of a spending pattern wherein the view is selected from the group comprising a time-based view, a geographic view, a business activity view, a market segment view, a spend category view, an itemized view, a currency view or a health care account view.

14. The method of claim 10 wherein logging the receipt further includes storing information for a receipt in a database that is indexed by one or more of location, date of transaction, type of good or service, payment mechanism, vendor or other categorization based on information included in received receipts.

15. The method of claim 1 wherein providing an acknowledgment includes providing a user identifier associated with the user associated with the transaction so that the entity associated with the transaction can verify that the receipt was attributed to a correct user.

16. The method of claim 1 wherein providing the notification includes providing transaction details, receiving an indication of an acceptance or repudiation of the transaction from a user, and providing notification to the entity associated with the transaction of an indication of an acceptance or repudiation of the transaction in real time.

17. The method of claim 1 further comprising mining data in the database associated with logged receipts and providing targeted content delivery to the user based on the mined data.

18. The method of claim 1 wherein providing the acknowledgment includes providing an offer to the user based at least in part on details of the transaction.

19. The method of claim 1 further comprising providing an interface to enable a user to search for a receipt for a particular transaction and presenting a located receipt so as to facilitate a return of merchandise associated with the transaction.

20. The method of claim 1 further comprising logging each product purchased, receiving notice of a recall for a product, locating a receipt in the database that indicates purchase of the product, and providing a notice to a user associated with the purchase of the recall.

21. The method of claim 1 further comprising identifying a product that is part of a transaction, determining whether a product registration is required for the product, and registering the product for a user including providing details related to a receipt that has been received for a given transaction.

22. The method of claim 21 further comprising seeking approval to register the product from a user and, upon receipt of approval, registering the product.

23. The method of claim 1 wherein providing a notification further includes identifying one or more restrictions on a user account, evaluating a current receipt to determine if one or more of the restrictions has been violated and notifying the user as part of the notification when the restriction has been violated.

24. The method of claim 23 wherein the restrictions relate to set thresholds for one or more of a purchase amount, a purchase location, a purchase aggregate amount in a time period, a number of purchases in a time period, a geographically constrained purchase, or a currency restricted purchase.

25. The method of claim 1 further comprising presenting spend data for a series of transactions for a user including rendering one or more graphics that present the spend data.

26. The method of claim 1 further comprising evaluating spend data associated with logged receipts and presenting a spend-by-location view of the transactions where the spend-by-location view presents spend information on a map effectively linking spend information with specific locations shown on the map.

* * * * *